United States Patent [19]

Laverriere

[11] 4,389,064

[45] Jun. 21, 1983

[54] GRIPPING DEVICE OPERATING BY SUCTION

[75] Inventor: Stanislas G. L. Laverriere, Villeneuve les Sablons, France

[73] Assignee: S.A. Joulin Sema, Etampes, France

[21] Appl. No.: 324,555

[22] Filed: Nov. 24, 1981

[30] Foreign Application Priority Data

Dec. 5, 1980 [FR] France ................................ 80 25818

[51] Int. Cl.[3] ............................ B66C 1/02; B32B 3/12; B32B 3/24; B32B 3/08

[52] U.S. Cl. .................................... 294/64 R; 209/905; 414/627; 428/136; 428/137; 428/308.4; 428/310.5; 428/322.7; 428/306.6

[58] Field of Search ........... 414/627; 294/64 R, 64 A, 294/65; 428/136, 137, 308.4, 310.5, 322.7, 306.6; 209/905

[56] References Cited

FOREIGN PATENT DOCUMENTS

| | | |
|---|---|---|
| 1957798 | 5/1971 | Fed. Rep. of Germany . |
| 2629160 | 1/1978 | Fed. Rep. of Germany . |
| 2291127 | 6/1976 | France . |

*Primary Examiner*—Alexander S. Thomas
*Attorney, Agent, or Firm*—Brisebois & Kruger

[57] ABSTRACT

The invention relates to suction prehension devices without flap valves. In particular, it relates to a suction prehension device without flap valve of the type including a case (1) connected to a suction cluster and whose base (5) is constituted of a perforated plate having on its exterior face a layer of porous material (3), such as a plastic material foam having, facing the perforations of the said plate, openings (4,6) passing through it from one side to the other, characterized in that the internal surfaces of the openings (4,6) is covered by a sealing or semi-permeable layer (12). Preferably, the sealing or semi-permeable layer (12) is constituted of a bituminous or rubbery coating.

7 Claims, 7 Drawing Figures

Fig.1
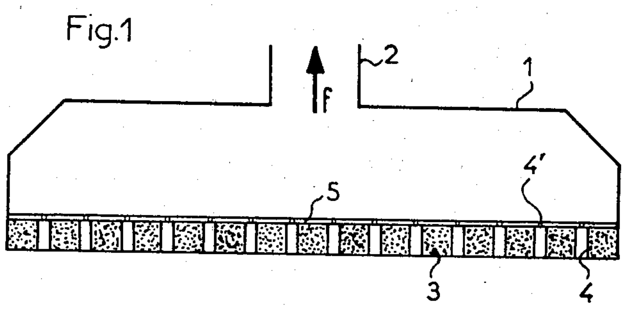
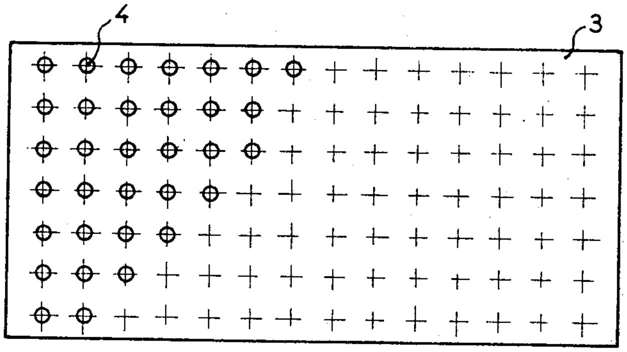
Fig. 2
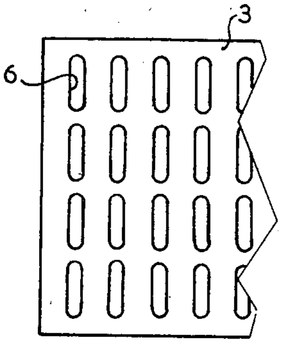
Fig.6
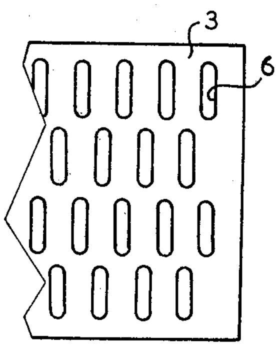
Fig. 7

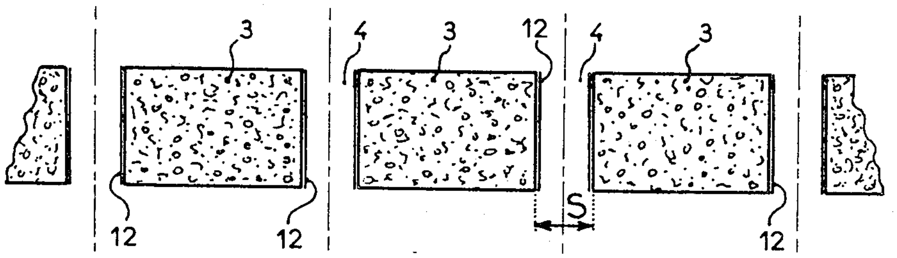
Fig.3
Fig.4
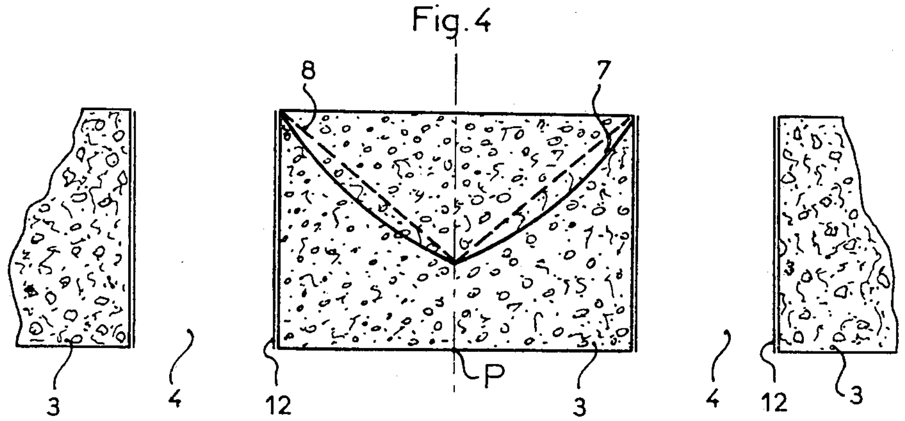
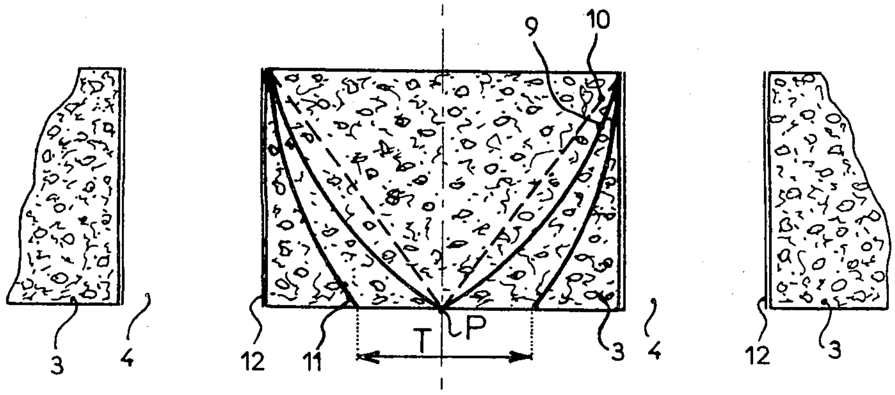
Fig.5

GRIPPING DEVICE OPERATING BY SUCTION

The present invention relates to a grasping or gripping device operating by suction for operating on a load, first taking hold of it up and then eventually moving it.

One particularly desirable application lies in the handling of wood, more precisely, boards. However, it should be noted that this application is certainly not limiting, and that, although in the present description only the gripping and handling of boards are discussed, the device of the invention may be used for various loads regardless of their dimensions, shapes, and materials.

As to the boards, their dimensions and therefore their weights are very different. For example, for a wooden log of a given length, the thickness of the sawn boards depends on their intended use, their width varies for any one log, and increases as the middle of the log is approached.

Suction gripping or holding devices with flap valves are known, being entirely satisfactory in certain applications, but they are complex and therefore burdensome; they are outside the spirit of the present invention.

Suction gripping or prehension devices without flap valves are also known, of the type having a casing connected to a suction cluster, and whose base is constituted of a perforated plate which has on its exterior face a layer of a porous material, such as foam plastic material, which has facing the perforations of the plate openings passing partly through it.

The invention relates to a suction prehension device without flap valves, or of the latter type.

In these devices, when a load, for example, a board, is seized by the perforated base of the suction case, several kinds of leaks have been observed, which can be of three types.

First there are the so-called ordinary leaks which result from the existence of certain holes which are either not covered and blocked by the load, or only partially covered. Through these holes the air passes freely as a result of the suction and there is total leakage. Because of their nature, these leaks result entirely from the relative dimension of the load to be seized and of the perforated plate constituting the base of the suction case.

Next there are so-called perimeter leaks which exist at the plane of the lines of contact between the surface of the load and the perforated base of the suction case. These failures may be reduced by providing seals which can, for example, conform to or be placed along the free margin of the grid of the base of the perforated plate. To be fully effective, these seals must be relatively rigid and it is particularly essential that the surface of the load not be too irregular.

Finally there are leaks due to the porosity of the material constituting the load. These leaks can be very significant in the case of a cellular material and non-existent for example in the case of sheet metal plates.

For a given type of load, the different leaks determine a high efficiency and a low efficiency for the device. The force of the suction cluster to be used depends on these values taking into account a safety factor.

By use of the above layer of a plastic foam, these leaks can be largely avoided. The use of this plastic material is known in the prior art, as explained below.

German Pat. No. DE-A-2,629,160 relates to a suction lifting device constituted of a plate or block 1, made of an elastic and air permeable material, and which is fastened by its rear face to a support plate 2. Block 1 has a series of openings 11 whose section increases in the direction of the suction surface. The openings are connected by conduits 31 to a vacuum source 32. Block 1 is made of a polyurethane foam. According to the patent, plastic foam block 1 uniquely, perfectly takes the form of the surface of the load to be lifted, especially when this latter has some irregularities. According to one preferred embodiment, block 1 is made of a polyurethane foam with closed cells. It thus appears that the foam in no way contributes to the suction effect.

French Pat. No. FR-A-2,291,127 describes a lifting device in which a metal suction plate 6 is constituted of an upper sheet metal plate 11 and a lower part 12 of expanded polyurethane foam forming a compressible covering. Plate 6 is pierced by a series of holes. Here, it is not specified whether the foam has open or closed cells.

On the contrary, the devices following the two patents cited are designed for lifting loads of small weight and dimensions (textile materials, sheets, clothes, pasteboard in the first case, and containers in the second).

Finally, German Pat. No. DE-A-1,957,798 concerns a lifting device having a suction chamber 1 connected to a vacuum source 2 and which has on its lower wall a seal plate 4 made of a flexible foam without a closed exterior face. Moreover, this foam must necessarily have closed cells (page 1, last paragraph) to prevent any direct passage of air. The suction must be accomplished entirely through suction openings 15, 17 piercing the bottom of chamber 1 and foam 4.

The devices of the prior art cited above are entirely effective for lifting and transporting loads of small weight and size.

On the contrary, their use in the applications envisioned in the present invention is considered impossible under acceptable economic conditions.

Actually, to lift heavy loads such as wooden boards, and loads of large size, for example a layer of boards covering a surface on the order of $3m^2$, use is made of foams of very low density to limit the crushing force of the foam on the load to be lifted. This crushing force must be taken into consideration to ensure a seal between the foam and the load and consequently, efficient operation of the device.

For foams of high density, particularly the foams with closed cells cited in the prior patents cited above, it is necessary, to envision a crushing force on the order of 100 $g/cm^2$, that is for a surface of $3m^2$, the necessary force would be 3,000 kg. This requires an extremely heavy lifting device of exorbitant cost. Moreover, the use of such a device would cause on the load a reaction effect proportional to the crushing force which precludes practical use of such a device.

Thus one is led to use foams of very low density having a very high proportion of pores or open cells. In this case, the crushing force can be reduced, for example in the application cited above, to a value of about 10 $g/cm^2$ which is acceptable in a practical embodiment.

It will also be noted that, even with the use of a foam with closed cells, these latter will automatically be opened after a certain number of successive crushing operations.

To the contrary, foams of very low density and with pores or open cells have the disadvantage of being highly permeable to air so that the suction effect is directly through the foam. This is acceptable to a certain extent but when the suction effects produced through the foam and through the openings are identical, the efficiency of the device is reduced below practically acceptable levels.

The object of the present invention is to provide a suction prehension device of the type described above which overcomes the disadvantages of the devices of the prior art. A particular object of the invention is to provide means for limiting the disorder of the suction effects, carrying it out through foam of very low density with open pores and through openings traversing the bottom of the case and the foam layer.

According to the invention, the internal surface of the openings is covered with an air-tight seal or semi-permeable layer.

Preferably the seal or semi-permeable layer is constituted of a bituminous or rubbery coating.

According to another variant, the opening has an oblong section.

Other characteristics and advantages of the invention will become apparent from considering the following description, with reference to the attached drawings given solely by way of example:

FIG. 1 is a schematic view in section of the suction prehension device without flap valves, of the prior art, FIG. 2 is a bottom view of the device of FIG. 1, FIG. 3 is a partial view in sectional, on an enlarged scale, of the perforated base of the device according to the invention, FIGS. 4 and 5 illustrate schematically the influence of the porosity of the material constituting the perforated base of the prehension devices on the suction phenomenon, FIGS. 6 and 7 are partial views similar to those of FIG. 2 showing variations of the device according to the invention.

The prehension device shown at FIG. 1 is constituted of a case 1 whose upper portion is connected by a tube 2 to a suction cluster which is not shown. The suction inside case 1 occurs in the direction of arrow F.

The base of case 1, which is rectangular in the example shown, is constituted essentially of a foam plate 3 in which are made several openings 4 passing through plate 3 and thus connecting the interior of case 1 to the exterior when no load is in position to block them.

Foam plate 3 is fastened to the base of case 1, on the one hand along the periphery of this latter and on the other hand to the middle of structure 5 comprising at least one opening 4′, by opening 4, providing communication between case 1 and openings 4, the section of this opening of these openings being calibrated as a function of the section of openings 4. The sole function of structure 5 is to support foam plate 3 mechanically; it does not take part in the suction function or the prehension of the device.

As is shown on FIG. 2, the openings are cylindrical and are placed along parallel lines.

The device shown on FIGS. 1 and 2 is known but has the disadvantages discussed above.

To eliminate these disadvantages, according to the invention, a layer 12 is placed on the interior walls of openings 4, as is shown on FIG. 3. This layer may consist for example of a bituminous or rubbery coating or a similar material. It can be air-tight or partially permeable to air. The object of this layer is basically to control the porosity of the foam 3 used, and to prevent passage of the suction air through foam portions 3 toward openings 4. Such flow of air, which is inevitable in devices of the prior art, as described in the introduction above, results in a noticeable decreased in the efficiency of the device.

The operation of the invention and the advantages resulting from the use of a perforated foam plate 3 supplied with openings 4 with layer 12 will now be described with reference to FIGS. 3, 4, and 5.

In view of the porosity of foam 3, the aspiration or suction field is not limited in surface to a surface corresponding to that of openings S (FIG. 3).

On FIG. 4 are shown two openings 4 defined by the part limited toward the top by line 7 of portions of foam plate 3. Line 7 shows the distribution of the suction effect. Line 8 in broken lines shows the theoretical behavior of this zone.

It will be noted on FIG. 4 that, even at the center of the base of the central foam portion 3 shown, which is at point P, a suction effect is observed and it participates in the prehension function of the assembly. The importance of the lower zone delimited by line 7 of course depends on the thickness of foam plate 3 and especially on its porosity, that is, on the proportion of open cells in foam 3.

On FIG. 5, practical curve 9 and theoretical curve 10 illustrate a case in which the parameters allow the production at point P of an essentially null suction effect.

The lateral zones of the portion of foam 3 delimited by lines 11 illustrate a case in which there is, at the base of foam element 3, an entire zone T in which no suction effect is observed.

As one can see, FIGS. 4 and 5 illustrate the fact that the aspiration of suction which provides prehension is not limited to surfaces S corresponding to the section of openings 4 but each surface S is surrounded by a halo in which the suction operates, diminishing in proportion as the distance from the axis of relevant opening 4 increases.

In view of the suction halo surrounding openings 4 of foam plate 3, it is possible to reduce the passage of openings 4, which allows on the one hand reduction of the probability of failure and on the other hand and in particular reduction of the power of the necessary suction source.

The pressure of the layer according to the invention prevents complete fusion of the suction effects produced by the openings and the halo.

The variation of FIG. 7 shows a foam plate 3 in which are made oblong openings 6. The large dimension of openings 6 is parallel to the axis of the boards or similar products to be lifted. On FIG. 6, openings 6 are placed in parallel lines offset from one line to the other. In the case of FIG. 7, offset of openings 6 from one line to the other gives the network of openings 6 a staggered arrangement.

According to one preferred embodiment of the invention, the density of the foam used is about 45 $kg/m^2$ and the foam has about 16 to 20 cells per $cm^3$. In such a case, the crushing force necessary would be on the order of 50 g/cm.

Of course, the invention is not limited to the embodiments described and shown here, but may undergo numerous modifications without departing from the scope of the invention.

I claim:

1. A suction prehension device comprising, a casing having a base plate, means on said casing for connecting the casing to a source of suction, said base plate having a plurality of perforations therein for communicating suction from within the casing to an exterior face of the base plate, a layer of low density open cell foam material extending across and fixed to the exterior face of said base plate, said layer of foam material having an outside and a plurality of openings extending through the layer from the outside surface to the base plate, said openings communicating with the perforations of the base plate, said openings having internal surface, and means for limiting air flow through the internal surfaces of the openings from the open cell foam of the foam material to enable the outside surface of the foam material to assist prehension, said means comprising, an at least partially air tight covering on the internal surfaces of the openings.

2. A device according to claim 1 wherein said covering comprises a bituminous a rubbery material.

3. Device according to claim 2 wherein said openings in the foam layer have an oblong section.

4. Device according to claim 3 wherein the foam material has a density of approximately 45 kg/$m^3$.

5. Device according to claim 4 wherein said foam material has on the order of 16 to 20 cells/$cm^3$.

6. Device according to claim 1 wherein the foam material has a density of approximately 45 kg/$m^3$.

7. Device according to claim 1 wherein said foam material has on the order of 16 to 20 cells/$cm^3$.

* * * * *